United States Patent [19]
Tomenceak

[11] 3,888,146
[45] June 10, 1975

[54] CONTOUR MACHINING

[75] Inventor: Arthur A. Tomenceak, Fairfield, Conn.

[73] Assignee: The Bullard Company, Bridgeport, Conn.

[22] Filed: May 6, 1974

[21] Appl. No.: 467,374

Related U.S. Application Data

[62] Division of Ser. No. 305,653, Nov. 13, 1972, Pat. No. 3,822,618.

[52] U.S. Cl. ................................. 82/1 C; 408/59
[51] Int. Cl. ...................... B23b 3/00; B23b 27/10
[58] Field of Search ........... 82/1, 1 C, 2, 14, 18, 19; 408/59

[56] References Cited
UNITED STATES PATENTS

| | | | |
|---|---|---|---|
| 2,870,578 | 1/1959 | Baier | 82/14 |
| 3,494,388 | 2/1970 | Sanders et al. | 82/18 |

FOREIGN PATENTS OR APPLICATIONS

| | | | |
|---|---|---|---|
| 690,366 | | United Kingdom | 82/14 |

*Primary Examiner*—Harrison L. Hinson
*Attorney, Agent, or Firm*—Mandeville and Schweitzer

[57] ABSTRACT

The disclosure relates to techniques in equipment for the machining with single point tooling of non-circular shapes and contours. The procedure according to the invention involves the use of a rotary cutting head, carrying one or more cutting tools, arranged to be advanced axially to accomplish internal boring or external turning of non-circular shapes. The cutting head, which may be considered either a boring head or a turning head, depending on whether the cut is taken internally or externally, is mounted for controlled advancing and retracting movements along its rotational axis. The curring tools themselves, which are carried by the cutting head, are mounted for controlled radial extending and retracting movements as a function of the rotational position of the spindle. The extending and retracting movements of the cutting tool or tools is controlled by means of a pre-shaped contour cam mounted in fixed relation to the workpiece. During each rotation of the spindle, the cutting tools are extended and retracted according to the pattern of the contour cam, resulting in a contoured, non-circular, cutting or boring of the workpiece. Because the tool-carrying spindle rotates, while the work remains stationary, the centrifugal force created by the spindle rotation is used to great advantage to assist in controlling movement of the tool slide in accordance with the path determined by the contour cam.

The process and apparatus of the invention can be utilized to outstanding advantage in connection with the machining of epitrochoidal chambers for rotary combustion (e.g., Wankel) engines. Significant process aspects of the invention are directed to that end. In this connection, the invention involves the two-stage machining of an epitrochoidal chamber, with the spindle axis of the machine offset a predetermined distance from the plane dividing the two principal lobes of the chamber. In accordance with an important aspect of the invention, by offsetting the spindle axis along the major axis of the chamber, to be located a short, predetermined distance from the transverse dividing plane, an entire half of the epitrochoidal chamber may be machined in one pass of the spindle, using single point cutting tools. The spindle axis is then symmetrically repositioned in offset relation on the opposite side of the dividing plane, to effect machining in a single pass of the other half of the chamber. This extraordinary technique permits exceptional time economies to be realized in the machining of the combustion chamber while at the same time achieving much greater levels of accuracy than has been obtainable with conventional machining processes.

7 Claims, 7 Drawing Figures

CONTOUR MACHINING

This is a division of application Ser. No. 305,653, filed 11/13/72, now U.S. Pat. No. 3,822,618.

BACKGROUND OF THE INVENTION

The machining of non-circular shapes by conventional means has certain shortcomings in terms of both speed and accuracy. One of the common conventional techniques is contour milling, wherein a milling cutter and a workpiece to be machined are caused to have a controlled relative movement, enabling the milling cutter to advance along a predetermined contoured path.

Because machining by single point tooling has many advantages over milling, at least in certain applications, previous efforts have been made to construct a turning or boring machine in a manner to accommodate the cutting of non-circular contours, either externally or internally on the workpiece. A notable example of such prior efforts is reflected in the E. H. Johnson, et al., U.S. Pat. No. 2,983,174, owned by the assignee of this invention. In the system of the Johnson patent, a workpiece is mounted on a rotatable work supporting table, for rotary movement relative to a cutting tool. A contouring cam is driven by the rotating workpiece and, as it moves through each cycle of rotation, it functions to actuate a cutting tool radially inward or outward according to a predetermined contour program. Thus, the machining operation effected by the cutting tool is of a non-circular form as determined by the contour of the program cam. In its broadest aspects, the present invention seeks to take advantage of important underlying principles of the machine of the Johnson, et al., patent, while at the same time significantly improving the machine from the standpoint of its practical operability.

SUMMARY OF THE INVENTION

In accordance with the invention, a new and improved contour machining apparatus is provided, utilizing some of the basic principles of the Johnson, et al., U.S. Pat. No. 2,983,174, which provides for the non-rotational mounting of a workpiece to be cut and provides a rotary tool-carrying spindle which is movable axially relative to the workpiece. It is significant to the present invention that the spindle, and not the workpiece, is rotated during machining operations. Normally, the spindle will also be mounted for axial movement relative to a stationary workpiece. However, axial movement of the workpiece relative to the tool-carrying spindle would not be inconsistent with the basic teachings of the invention.

In the machine of the invention, a rotatable, tool-carrying spindle mounts a cutting head in which are movably mounted suitable cutting tools. Typically and to considerable advantage, these cutting tools are arranged in opposed pairs, to provide for dynamic balance of the rotating spindle. For most applications, only a single pair of cutting tools will be employed.

According to the invention, the cutting tools are mounted in the cutting head for controlled sliding movement in a radial direction relative to the turning axes. Further, the slideable mounting means for the cutting tools are operably associated with a contouring cam (the latter having a non-rotatable association with the workpiece) such that the centrifugal force of rotation of the spindle will tend to urge cutter-controlling cam followers into contact with the cam surface. This beneficial centrifugal action is augmented by a positive and controllable force from a small hydraulic actuator associated with the cutting tool support. The arrangement is such that highly effective and accurate following of the surface of the contour cam is possible, even when the spindle is being rotated at relatively high speeds. Thus, with increasing speeds, there is an increasingly large centrifugal force acting radially outward upon the movable cutting tool supports to assist in the faithful outward following of the contour cam surface.

The apparatus of the invention also includes controllable means, independent of the contour cam, for effecting controlled movement of the cutting tool elements independently of the contour cam, when desired. This is of particular importance to accommodate retraction of the spindle upon completion of a cutting operation without scoring or otherwise defacing the freshly machined contoured surface. This controlled motion may be effected by means of heavy springs acting in opposition to the auxiliary fluid cylinders, or additional fluid cylinders may be utilized if desired.

An especially significant aspect of the invention resides in the providing of a new and highly simplified and expedited technique for the utilization of the new apparatus in the machining of epitrochoidal chambers and the like. In the production of so-called rotary combustion or Wankel engines, a critical component is the combustion chamber, the interior contour of which is substantially in the form of an epitrochoid. An epitrochoid is a curve generated by a point on the radius of a circle as it "rolls" about a second circle. This is an extremely complex curve from the standpoint of its mass production machining. Indeed, the production of the combustion chamber is one of the most difficult and costly procedures involved in the manufacturing of a typical rotary combustion engine. By way of example, conventional procedures involve the slow and laborious milling of the chamber to roughly epitrochoidal shape, followed by precision grinding. Not only is the milling operation extremely slow, in mass production terms, but the accuracy of the operation is inherently so poor that final grinding operations are required to remove excessive amounts of material. With so-called single point machining, according to the techniques of the present invention, an epitrochoidal chamber may be quickly machined in a simple, two-stage operation, with an extremely high degree of accuracy. This not only achieves exceptional savings in the machining operation itself, but also results in significant downstream savings in the subsequent finish grinding.

A critical consideration in the effective use of the contour machining equipment of the invention in the new technique for machining of epitrochoidal and similar contours lies in the realization that the contour must be cut in a two-stage operation, notwithstanding that the equipment may have the capacity, in terms of the extending and retracting of a cutting tool, to form the entire epitrochoidal contour in a single operation. In the combustion chamber of a rotary combustion engine of current design, for example, there is not an extraordinary difference between the length of the major and minor axes of the epitrochoidal, so that there would be no technical difficulty in constructing a cutting head having tools able to circumscribe the desired contour in a single stage of operation. Nevertheless, the invention involves the key realization that the range of contours over which effective single point machining can be achieved are more restricted than the ability of the tools themselves to merely circumscribe or trace a range of contours. This is a function of limiting the positive and negative rake angles of the cutting tools and of providing tool configurations within practical limits for maintaining production durability and the like.

In the process of the invention, an epitrochoidal chamber is machined to great advantage in a two-stage operation in which the spindle axis of the contour cutting tool is positioned along the major axis of the chamber contour, offset from the minor axis a distance of about 10 percent of the overall length of the major axis.

DESCRIPTION OF PREFERRED EMBODIMENTS OF THE INVENTION

Figure 1:
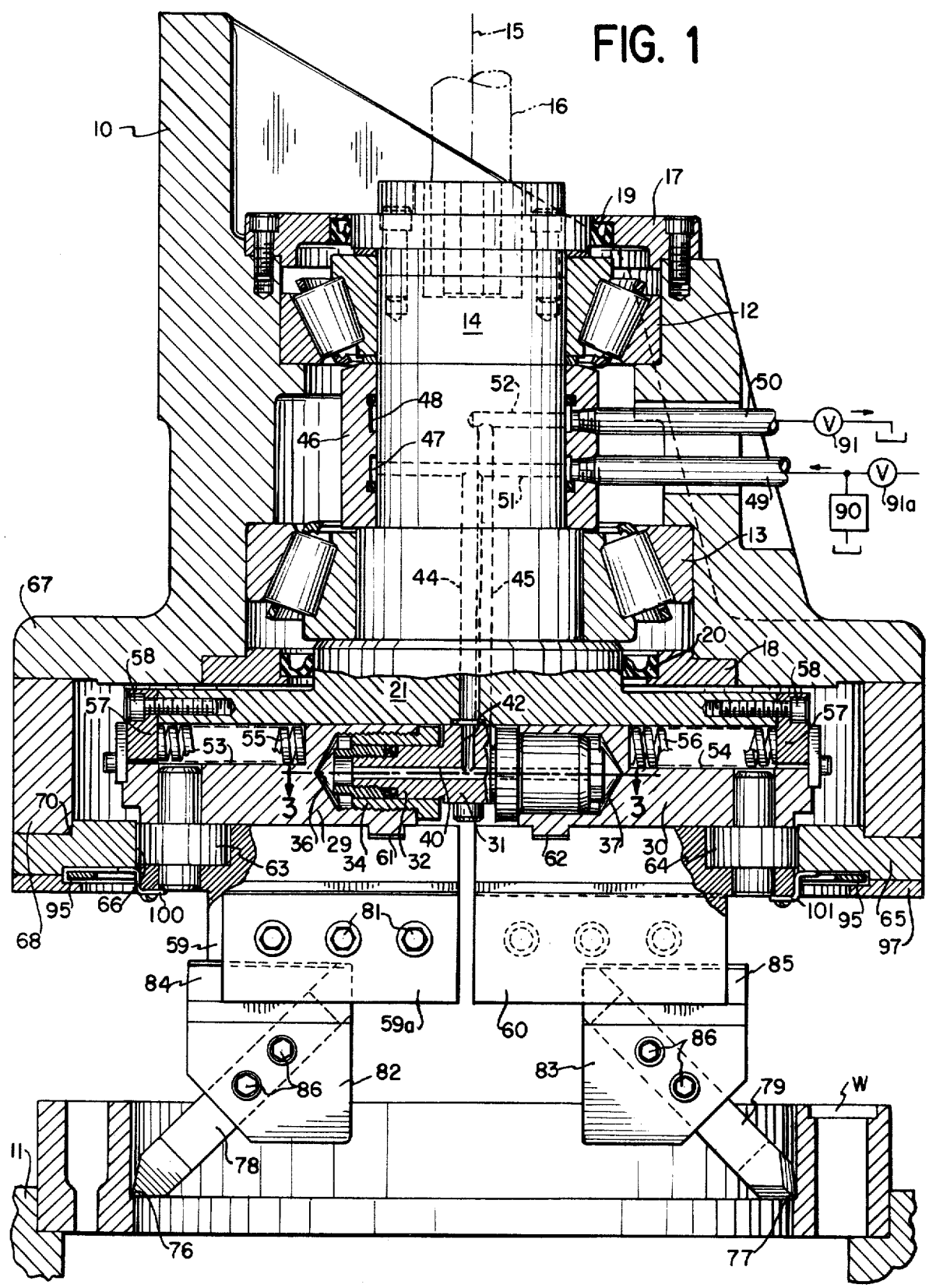
FIG. 1 is a cross-sectional view of the cutting portion of a contour cutting machine incorporating the significant principles of the invention and illustrating the equipment in a configuration suitable for the contour machining of a non-cylindrical chamber.
Figure 2:
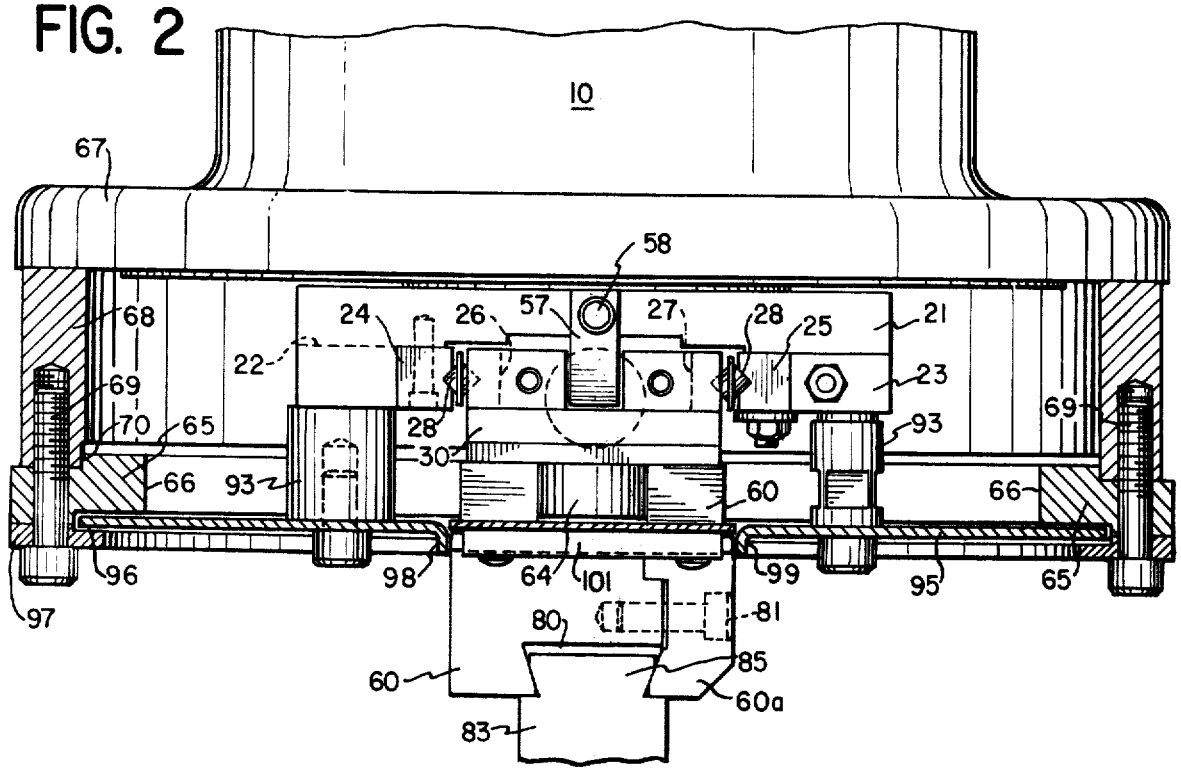
FIG. 2 is a fragmentary view, partly in cross-section, taken generally at right angles to the view of FIG. 1.

Referring now to the drawing, and initially to FIGS. 1 and 2 thereof, the reference numeral 10 designates generally a spindle housing of an otherwise more or less conventional vertical boring mill. The basic features of a boring mill are well known to those skilled in the art and are not reproduced. It will be understood, however, that the spindle housing 10 is appropriately guided in the machine frame for controlled vertical motion. In some instances, the slide 10 may also be capable of a horizontal motion for initial positioning, but such a capability forms no part of the present invention. Although in a typical machine the spindle housing 10 itself will be arranged for vetical motion relative to workpiece holding table 11, it is consistent with the fundamental principles of the invention that the table 11 could be capable of vertical movement in conjunction with a vertically immovable cutting head.

Appropriately mounted in the housing 10, by means of heavy duty bearings 12, 13 is a spindle 14. The spindle is fixed axially in the housing 10 but is adapted for rotation about its own axis 15. Suitable means (not shown) are provided for connection with the upper end 16 of the spindle for driving it at appropriate rotational speeds. Typically, the spindle 14 is driven by means of a suitable electric motor coupled to the spindle by a speed selection gear box.

As reflected in FIG. 1, the spindle housing is sealed off above and below the main support bearings 12, 13 by means of suitable end caps 17, 18 and seals 19, 20.

At its lower extremity, the spindle 14 is provided with a tool-carrying head 21 of substantially enlarged diameter. The tool-carrying head is provided with spaced, opposed side flanges 22, 23 (FIG. 2) which mount along their parallel inside faces a spaced pair of hardened bearing ways 24, 25. The bearing ways 24, 25 cooperate with opposing sets of hardened bearing ways 26, 27 and sets of bearing rollers 28 to form a linear roller bearing arrangement for the independent support of tool slides 29, 30. The slides 29 and 30 are supported for linear movement along a diameter of the tool-supporting head 21 and are adapted for independent movement toward and away from the central axis 15 of the spindle.

Figure 3:
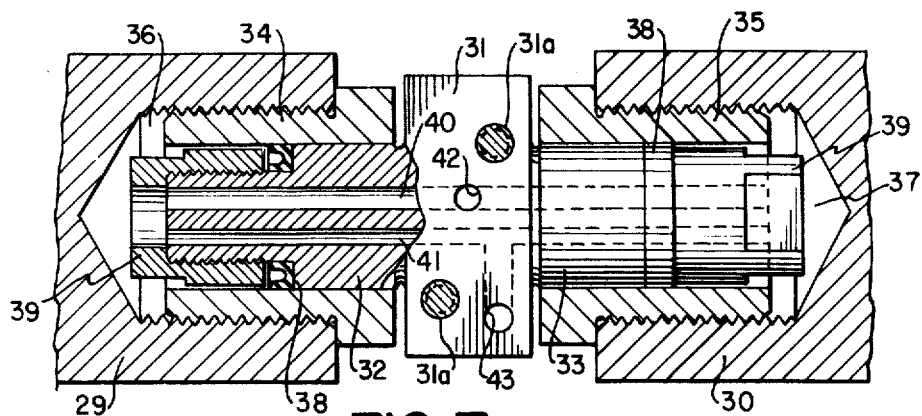
FIG. 3 is an enlarged cross-sectional view taken generally along line 3—3 of FIG. 1, illustrating an auxiliary actuating cylinder means utilized for urging of cutting tools in an extending direction, in the apparatus of FIGS. 1 and 2.

Secured to the bottom face of the tool-supporting head 21, in general alignment with the spindle axis 15, is an inverted tee-shape fitting 31 (see FIG. 3). The tee-shaped fitting, which may be referred to as an actuator fitting, is secured to the head 21 by bolts 31a and includes oppositely directed cylindrical extensions 32, 33. These extensions are arranged to be received within bushings 34, 35 threadedly engaged with and carried by the respective tool slides 29, 30. The tool slides are provided with internal bores forming actuator chambers 36, 37 in which the ends of the actuator extensions 32, 33 are exposed. Each of the extensions is provided with a resilient sealing element 38 and retainer 39 to form an effective sliding seal between the extensions 32, 33 and the respective bushings 34, 35.

Fluid inlet and exhaust passages 40, 41 are provided in the actuator extensions 32, 33, communicating with vertical passages 42, 43 in the actuator fitting and, in turn, with passages 44, 45 extending vertically in the spindle 14 (see FIG. 1).

Between the spindle support bearings 12, 13 there is provided a bushing 45 having a pair of circumferential grooves or recesses 47, 48 therein communicating respectively with inlet pipes 49, 50. Transverse passages 51, 52 in the spindle communicate with the vertical passages 44, 45 and can provide for a complete fluid circuit. Appropriate control valve means are connected to the inlet and outlet lines 49, 50 for effecting controlled admission to or exhausting from the actuator chambers 36, 37 of pressure fluid, as will be described.

In the radially outward portion of each of the tool slides 29, 30, there are provided radially disposed recesses 53, 54 in which are received compressible coil springs 55, 56. Retainer plates 57 are secured by bolts 58 to the opposite sides of the tool-supporting head 21 and serve to close off the open outer ends of the spring recesses 53, 54. The arrangement of the springs 55, 56 is such that they are at all times maintained under at least some compression and serve as return springs, urging the respective tool slides 29, 30 in a radially inward direction. Thus, in the absence of positive fluid pressure in the chambers 36, 37 the tool slide will be moved by the return springs 55, 56 to their radially inward or retracted positions. In appropriate cases, separate hydraulic actuator means may be used to advantage to replace or augment the action of the return springs.

Each of the tool slides 29, 30 has secured thereto a slotted tool block 59, 60. These tool blocks are secured by suitable bolts (not shown) and are accurately located on the associated slides 29, 30 by means of transverse keys 61, 62. Each of the tool blocks 59, 60 carries at its radially outward end, a cam follower wheel 63, 64. As reflected in FIG. 1, the lower end of each cam follower is journalled in the tool block, while the upper end is journalled in the associated tool slide. The geometry of the arrangement is such that the radially outward extremities of the cam followers 63, 64 are exposed at and extend slightly beyond the radially outer end walls of the respective tool blocks 59, 60 (see FIG. 2).

In accordance with one of the significant aspects of the invention, a contour control cam 65 is mounted in surrounding relation to the tool blocks 59, 60, in alignment with the cam followers 63, 64. As will be more fully explained, contour cam 65 is provided with an inwardly facing control surface 66 of predetermined contour for engagement by the cam follower rollers 63, 64 during rotations of the spindle 14. The contour cam 65 is mounted in fixed relation to the spindle housing 10, so as to move up and down with the spindle while being non-rotatably supported. To this end, the housing 10 advantageously is provided with an outwardly extending flange 67 adjacent its lower extremity. To this flange 67 is secured a ring member 68, which extends downwardly in surrounding relation to the tool slides 29, 30. Typically, the ring 68 is of circular configuration.

As reflected in FIG. 2, suitable bolts 69 secure the control cam 65 to the lower extremity of the ring 66, so that the cam is in rigid association with the spindle housing 10. Advantageously, the control cam 65 is provided about its outer periphery with a circular recess 70 to facilitate accurate positioning of the cam relative to the ring 68. The inwardly facing wall 66 of the control cam is, of course, contoured according to the shape and size of the desired workpiece, as will be more fully explained, and thus has a variable space relationship with respect to the ring 68. The cam securing bolts 69 are arranged to be readily accessible to facilitate removal and replacement of the cam 65 for the machining of work pieces of different sizes and shapes.

Figure 5:
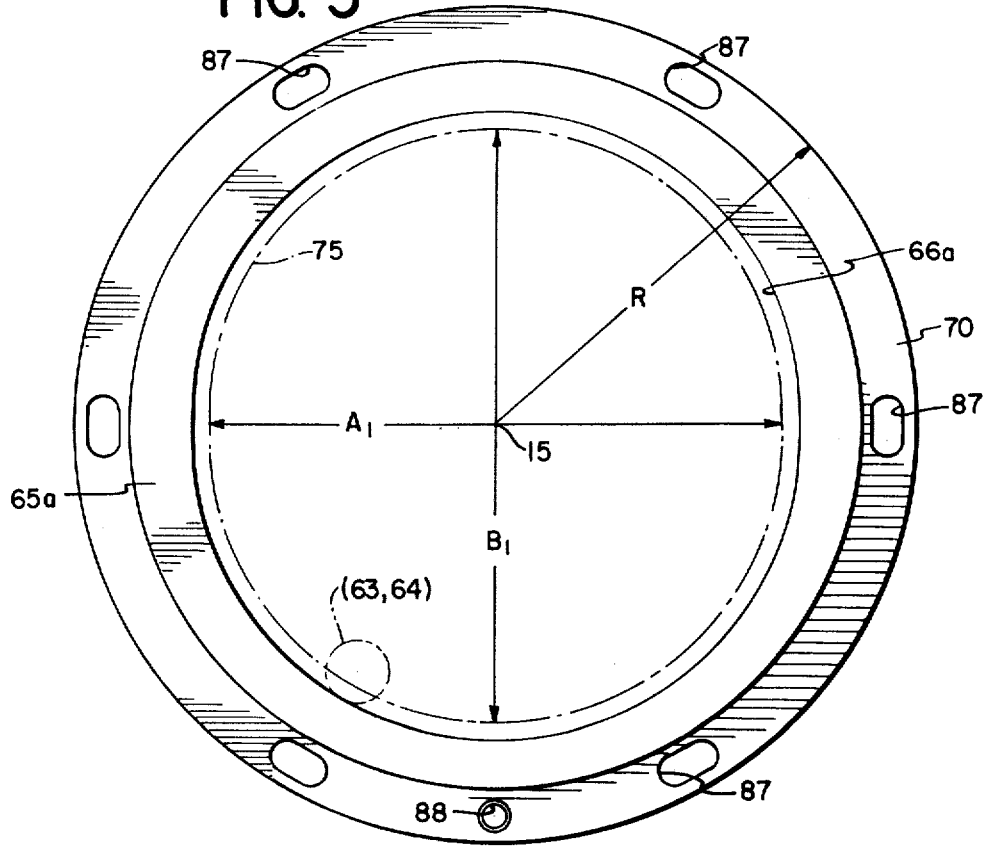
FIGS. 5 and 6 are plan views of illustrative forms of contour cams used in the apparatus of FIGS. 1 and 2 for the machining of pump chambers (FIG. 5) and a rotary combustion engine chamber (FIG. 6).
Figure 6:
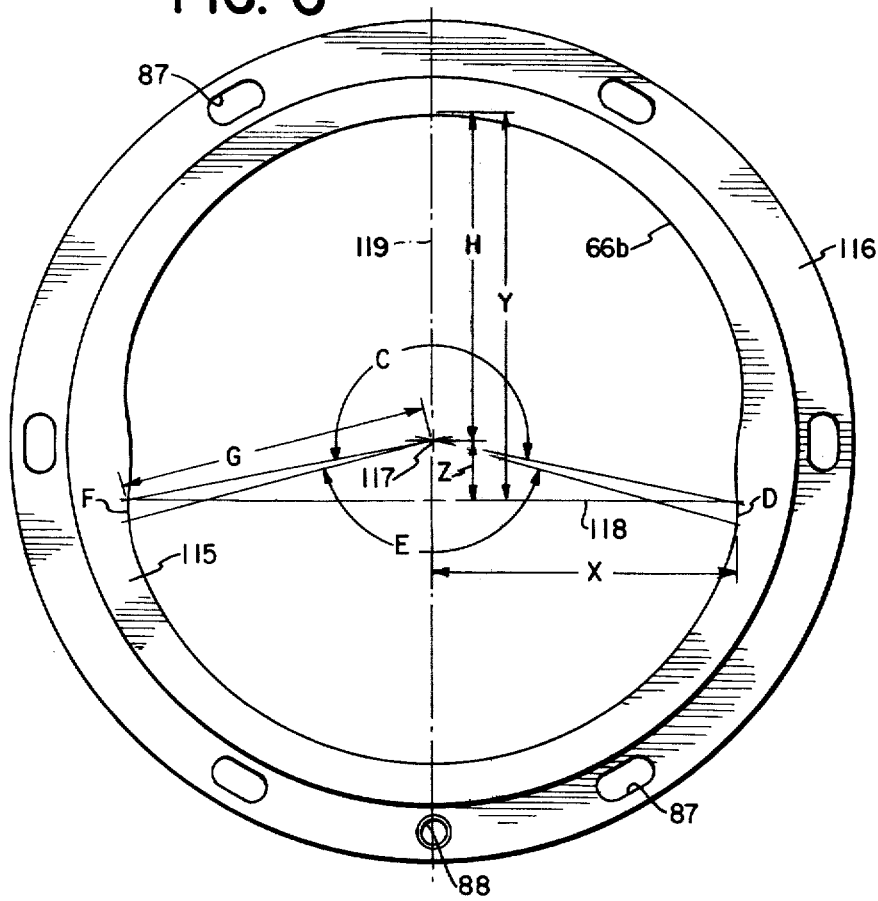

FIGS. 5 and 6 illustrate two possible forms of contour cams useful to advantage in connection with the apparatus and method of the invention. The cam 65a of FIG. 5, for example, is suitable for the machining of the internal chamber of a hydraulic pump. The interior chamber configuration is reflected by the broken line 75, which may be somewhat elliptical in form having a dimension $A_1$ along its minor axis and a dimension $B_1$ along its major axis. The control surface 66a may in certain instances substantially coincide with the outline 75 to be cut, but more typically will not so coincide. As will be readily appreciated, upon establishing a predetermined relationship between the location of the tip 76 or 77 of a cutting tool 78, 79, in relation to the outer surface extremities of the cam follower wheels 63, 64, it is possible to plot the surface 66a along which the cam followers 63, 64 must travel in order to effect a desired path of travel of the tool tips 76, 77.

The tool blocks 59, 60 have dove-tailed slots 80, formed in part by separate sections 59a, 60a of the tool blocks, which are secured by bolts 81. Tool holders 82, 83 having dove-tailed bases 84, 85, are received in the dove-tailed slots and rigidly clamped therein by the gripping sections 59a, 60a. The cutting tools 78, 79 are in turn, secured in the holders 82, 83 by suitable means such as clamping bolts 86.

By appropriate initial adjustment of the tools 78, 79 in their respective holders 82, 83, and adjustment of the holders in their respective tool blocks 59, 60, a precise, predetermined relationship may be established between the cutting tips 76, 77 and the cam followers 63, 64. For this purpose, a suitable setup jig (not shown) may be provided. The provision of such a jig is, of course, well within the capability of one skilled in the art.

Having established the relationship of the tool tip to the corresponding cam follower, it is a simple matter to plot the shape and size of the contour cam surface 66a to cause the tool tip to circumscribe the desired path 75.

The control cam 65a reflected in FIG. 5 includes a circularly recessed portion 70 provided with a plurality of bolt receiving openings 87. For convenience of assembly, the bolt opening 87 may be circumferentially elongated, with one or more locating holes 88 being provided to enable the contour cam to be precisely located with respect to the ring member 68 and spindle housing 10.

In the operation of the equipment to machine a generally elliptical pump housing cavity, for example, the cam 65a in FIG. 5 is secured in place on the spindle housing 10, and the cam follower wheels 63, 64 are properly aligned with the cam surface 66. A workpiece W is appropriately clamped in the work table 11, in predetermined alignment with the spindle axis 15. In the illustrated example, the contour cam 65a is mounted in symmetrical alignment with the spindle axis 15.

The tools 78, 79 having been properly adjusted, the spindle 14 is caused to rotate, and fluid under pressure is admitted through the inlet line 49 and into the actuator chambers 36, 37 to force the tool slides 29, 30 outwardly and bringing the cam follower wheel 63, 64 into firm engagement with the surface of the contour cam. As the spindle rotates relative to the spindle housing and contour cam 66a, the tool slides 29, 30 will be alternatively urged radially inward by the cam surface, and radially outward by the pressure fluid. In addition, centrifugal force of rotation will tend to augment the action of the pressure fluid in urging the tool slide radially outward. Thus, in each cycle of rotation, the cutting tool tips 76, 77 are caused to follow a precise contour corresponding to the borken line 75 in FIG. 5.

During rotation of the spindle, the spindle housing 10 is advanced toward the work (or in some cases vice versa), so that the cutting tools advance axially into and/or through the work. In the illustrated example, the cutting tools would serve to bore an elliptical hole in the workpiece W to achieve a desired elliptical pump chamber.

To accommodate displacement of the tool slides 29, 30 in a radially inward direction, by the action of the contour cam, appropriate relief is provided in the pressure fluid system. Of course, where the actuating fluid is a gas under pressure, there may be sufficient inherent compressibility in the gas to accommodate the necessary relief. However, where, as is preferred, the actuating fluid is a relatively incompressible hydraulic fluid, appropriate relief may be provided by means of a suitable accumulator or pressure relief means 90 in the external fluid line.

In accordance with one of the specific aspects of the invention, provision is made to support quick radial retraction of the cutting tools at the end of the cutting operation, to provide for axial withdrawal of the spindle without scoring of the freshly machined surface. To this end, fluid pressure in the exhaust line 50 may be released at the end of the machining operation to exhaust the pressure in the actuator chambers 36, 37 and permit the tool slides 29, 30 to be retracted by the return springs 55, 56. Typically, the rotation of the spindle may be slowed or stopped, to reduce the centrifugal forces acting on the tool slides 29, 30 during retracting of the spindle.

To advantage, an exhaust valve 91, in the nature of a bleeder valve, is provided so that there is at all times some flow of the hydraulic fluid through the system, with pressure control being exerted by causing or preventing fluid inflow by means of an inlet valve 91a. By this means, the hydraulic fluid within the spindle is continually replaced and prevented from over-heating.

As reflected in the drawings, the open lower end of the spindle housing is provided with a chip seal arrangement, to prevent entry into the precision mechanism of flying metal chips removed during the machining operation. To this end, the spindle head 21 includes a plurality of spacer posts 93, which extend downward alongside the tool slides 29, 30 and have secured thereto arcuately shaped chip seal plates 94, 95. The chip seal plates 94, 95 have arcuate outer edges received in an inwardly facing annular groove 96 formed in part by the contour cam 65 and in part by a retainer ring 97 secured to the contour cam by the bolts 69. At their inner edges, the chip seal plates 95 have downturned sealing lips 98 disposed alongside the tool blocks 59, 60 and serving to seal off effectively the region along the sides of the tool blocks. Between them, the chip seal plates 94, 95 form an elongated diametrically disposed slot extending from one side to the other of the contour cam and accommodating the presence of, and the desired radial movement of, the tool blocks 59, 60.

At the outer end extremities of the tool blocks, there are mounted chip seal plates 100, 101, which extend radially outward beyond the outer edges of the tool blocks and underlie the control cam in the region of the cam follower wheels 63, 64. As will be appreciated, during normal cutting operations, when the cam followers are in firm engagement with the contour surface 66, the chip seal elements 100, 101 will effectively seal off the region immediately underneath and adjacent to the cam follower wheels. The plates 65, in conjunction with the sealing elements 100, 101 effectively seal off the actuating mechanism from the entry of chips formed by the cutting operation.

As one of the important aspects of the invention, a contour machining apparatus as above described can be used to unusual advantage in the machining of epitrochoidal chambers for rotary combustion engines. In this respect, it is not to be inferred that the equipment of the invention is in any way limited to the specific applications herein described. Rather, it is to be understood that the advantages of using the equipment of the invention in the machining of rotary combustion engine chambers are so extraordinary and so outstanding as to constitute independent invention warranting specific description.

In the so-called Wankel or rotary combustion engine, the internal walls of the combustion chamber are formed generally on the contours of an epitrochoidal curve. The epitrochoid is a path generated by a point on the radius of a first circle, lying inside the boundaries of that circle, as the circle is "rolled" around a second circular path. The epitrochoidal path is a complex one to machine, and thus the machining of the combustion chamber for the Wankel engine has constituted one of the most difficult, time-consuming and expensive operations involved in the production of the engine. Conventionally, such chambers are rough machined by milling according to a numerical control program, for example, followed by precision grinding. By its nature, the milling operation is an extremely slow one, from a mass production standpoint, and the accuracy available through the milling process is relatively poor. Accordingly, very wide tolerances have to be provided for in the milling operation, resulting in the necessity for removal of large amounts of metal in the final precision grinding operation. Thus, although the final grinding operation itself is not too difficult, it is rendered relatively uneconomical in the conventional process by reason of the need for removal of excessive amounts of metal.

In accordance with the present invention, the contour machining equipment herein disclosed may be utilized to outstanding advantage in the direct machining of the epitrochoidal combustion chambers of the rotary combustion engine. This is made possible, in accordance with the invention, by the machining of the epitrochoidal combustion chamber in two separate stages, each serving to effect the machining of one-half of the chamber. As one feature of the invention, in the machining of each of the two stages of the combustion chamber, the center of the spindle axis is so located relative to the contours to be machined that the range of extending and retracting motions of the cutting tools is held to a minimum; more importantly, the extremes of the rake angle variation of the cutting tools relative to the surfaces to be machined are kept within practical operating limits. In practice, the center of the spindle axes is advantageously offset along the major axis of the epitrochoidal curve a distance of approximately 10 percent of the length of that major axis. By thus positioning the spindle axis during the machining of each stage of the chamber, the maximum negative and the maximum positive rake angle of the cutting tool may be reduced to around 15°. Further, the overall excursion of the cutting tool in a radial direction may be held within a maximum of 5 to 6 percent of the average working radius.

The equipment of the invention readily accommodates independent and asymmetrical motion of the individual cutting tools of an opposed pair. Thus, in the machining of an epitrochoidal chamber in two stages, the shape of the cut, and therefor the desired motion of the cutting tools, is asymmetrical relative to the axis of the spindle. By controlling tool position of each of two cutting tools independently with its own cam follower, each tool may be directed through an independent cutting path without reference to the instantaneous position of the opposed tool.

Figure 4:
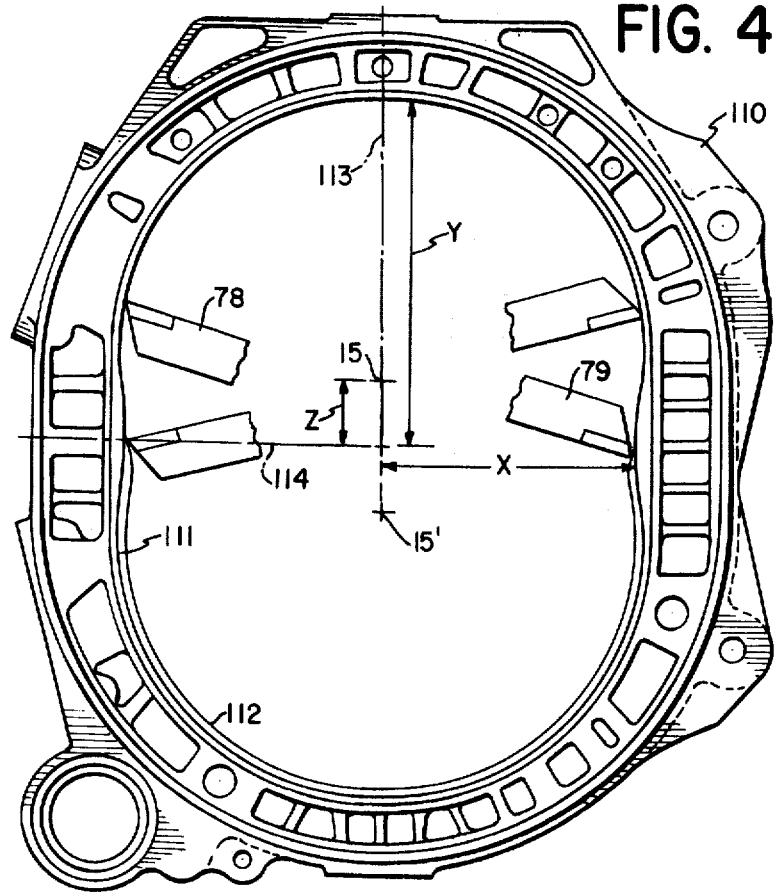
FIG. 4 is a representative plan view illustrating the machining of a rotary combustion chamber in accordance with the teachings of the invention.

Referring now to FIG. 4, there is shown a typical combustion chamber housing 110 for a rotary combustion engine. The contour of the chamber which is desired to be achieved by a machining operation is reflected by the line 111, which is substantially an epitrochoid. The outline reflected by the line 111 will be further slightly modified after boring by green grinding, surface plating, and finish grinding operations. However, in the process according to the invention, the boring operation itself can be carried out with such a high degree of accuracy, that subsequent grinding requirements are reduced to a practical minimum. In some instances, where tolerances can be held to 0.003 to 0.005 of true size, and a surface finish of less than 60 microinches RMS can be achieved, the green grinding step can be eliminated altogether.

In the casting illustrated in FIG. 4, the original cast walls of the chamber are indicated by the reference numeral 112. These are to be machined away by the cutting tools 78, 79 to achieve the semi-finished surface 111. In accordance with the invention, this machining is accomplished in two distinct stages, completing half of the machining operation in each stage. To this end, the casting 110 is secured on the work table with the spindle axis 15 of the cutting head positioned along the major axis 113 of the epitrochoidal contour, offset, however, a predetermined distance from the minor axis 114. The extent of this offset is significant and it is determined with reference to minimizing the overall excursions of the cutting tools and also minimizing the extreme rake angles to which the cutting tools are subjected.

In a typical Wankel engine combustion chamber, the half dimension X of the minor axis may be on the order of, for example, 4.298 inches, while the half dimension Y of the major axis might typically be 5.738 inches. For a chamber of such dimensions, an optimum amount of offset for the spindle axis 15 (reflected by the dimension Z in FIG. 4) is approximately 1.125. This optimum dimension Z can be determined empirically for machining parts of different configuration, bearing in mind the objectives of limiting tool excursions and rake angles. With the described offset location of the spindle axis for the described rotary combustion engine chamber of FIG. 4, the total tool excursion is approximately 0.238, or less than 6 percent of the median cutting radius. Likewise, the extremes of the tool rake angles are kept within about 15° positive and negative.

Referring now to FIG. 6, the control cam 115 used in the machining of epitrochoidal chambers of the type shown in FIG. 4, is provided with a circular recess 116 in its outer portion having openings 87 for fastening bolts and 88 for receiving locating means. The center of the circular cam is indicated at 117 and is positioned to coincide with the spindle axis 15 when the control cam is installed in the cutting head.

The control cam 115 illustrated in FIG. 6 is provided with at least two distinct regions, designated respectively by the arcs C and E. The arc C, taken about the cam center 117, extends over the entire area above the line 118 corresponding to the location of the minor axis of the epitrochoidal contour. The cam contour 66b extending over the area of the arc C corresponds to the contour of one-half of the epitrochoid, taking into account, of course, the relationships of the cutting tools to the cam follower wheels 63, 64. The arrangement is such that a cam follower wheel, traversing the cam surface 66b over the arc C, will cause the cutting tools 78, 79 to follow the desired machining path 11 (FIG. 4).

To advantage, the offset of the cam center 117 from the minor axis line 118 is such that the distance G from the cam center to the intersection of the contour surface 66b with the minor axis line 118 is approximately equal to the distance H from the cam center 117 to the cam surface 66b along the major axis line 119. In the particular example of the epitrochoidal curve, these two points represent the extremes of outward tool excursion.

As reflected in FIG. 4, as the cutting tools 78, 79 approach the minor axis 114 of the casting, the rake angles of the tool will be most extreme, negative on the left side and positive on the right side in the illustration. By locating the spindle axis 15 with the indicated offset, these rake angles may be kept well below 20°, enabling a satisfactory machining result to be achieved without undue strain on the cutting tools.

The lower portion of the contour cam 115, represented by the arc E in FIG. 6, extends substantially from one side to the other of the minor axis line 118, with small transition areas, reflected by the areas D and F, being provided where desirable. The contour of the cam surface 66b in the region of the arc E is of substantially uniform radius. To a great extent, the cutting tools moving through this portion of the arc are performing no machining operation, and therefore the tools may be maintained in fixed relation to the spindle during this period. As reflected in FIG. 4, some machining will be performed at the extreme ends of the D-E-F portion of the cycle, as the cutting tools enter and leave the material, but machining to the contour of the epitrochoid advantageously commences approximately at the minor axis (114, FIG. 4; 118, FIG. 6).

After machining of one side of the chamber, as reflected in FIG. 4, the casting 110 is repositioned to locate the spindle axis at the point designated 15'. Machining of the remainder of the chamber then proceeds in the manner just described. Most advantageously, this can be carried out in a multi-stage machining center such as with a so-called Mult-Au-Matic vertical boring and turning machine, as manufactured by The Bullard Company, Bridgeport, Connecticut. With such equipment, the work is advanced from one spindle station to another to effect the second stage of machining.

While some latitude in the offset positioning of the spindle axis is acceptable in the machining of a rotary combustion engine chamber, it appears that, for a chamber of the general proportions hereinbefore indicated, the offset of the spindle axis should be between 15 and 20 percent of the half dimension of the major axis.

The machining of epitrochoidal chambers in accordance with the techniques of the invention results in extraordinary production savings. In the first place, the machining operation, even through carried out in two stages, may be completed more quickly than machining by conventional milling techniques. In addition, and possibly of greater importance, the machining operation can be carried out to much higher levels of accuracy according to the invention, than by conventional procedures (e.g., to tolerances of about 0.005 or better inch pursuant to the invention, compared to 1/16 to ⅛ inch conventionally and to surface finishes of 30–50 microinches RMS). As a result, the finish grinding operations involve the removal of significantly smaller amounts of metal, enabling additional important savings to be realized in the latter phase of the production procedure. In some cases it may even be possible to avoid the so-called green grinding operation.

As will be appreciated, the equipment and techniques of the invention may be utilized to advantage in machining a wide variety of non-circular parts through the use of single point tooling on a rotary boring or turning machine. In cases of extreme non-circular configuration, it may be necessary to conduct the machining operation in a plurality of separate stages. However, the optimum number of stages, and the optimum location of the spindle axis relative to the work may be empirically determined by following the teachings of the disclosure.

Figure 7:
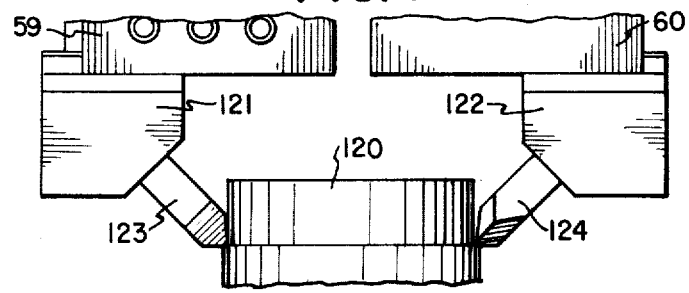
FIG. 7 is a simplified representation of an apparatus according to the invention in a configuration suitable for external turning of non-cylindrical workpieces.

The invention is, of course, equally applicable to the machining of exterior and interior surfaces. FIG. 7 illustrates a specific arrangement for the machining of an exterior surface on a workpiece 120. Tool holders 121, 122 are arranged in the tool blocks 29, 30 in reverse orientation as compared to the tool holders of the apparatus of FIGS. 1 and 2. The cutting tools 123, 124 project radially inward, so as to be engageable with the exterior surface of the workpiece 120. The arrangement of the contour cam, cam follower wheels, etc., is the same for the apparatus of FIG. 7 as for the apparatus of FIGS. 1 and 2. By observing an appropriate relationship between the tips of the cutting tools 123 and 124 and the outer surfaces of the cam follower wheels 63, 64, the cutting tools may be caused to follow a desired non-circular path, in the same manner as has been described with reference to the equipment of FIGS. 1 and 2.

In any of its forms, the equipment of the invention will utilize a rotary spindle and cutting head cooperating with a non-rotating contour cam carried in fixed relation to the spindle housing. With this arrangement, the centrifugal forces acting upon the radially movable cutting tools will at all times assist in maintaining the tools in a desired precise relationship to the contour cam, enabling increased operating speeds to be utilized. In addition, the equipment of the invention provides for independently movable, opposed tool-mounting slides which are actuated hydraulically or by other means accommodating independent movement. Accordingly, the radial excursions of the opposed cutting tools need not be symmetrical or otherwise dependently related, enabling asymmetrical machining operations to be carried out, as in the production of the rotary combustion chamber, for example.

It should be understood, of course, that the forms of the invention herein illustrated and described are intended to be representative only as certain changes may be made therein without departing from the clear teachings of the disclosure. Accordingly, reference should be made to the appended claims in determining the full scope of the invention.

I claim:

1. A method for machining a workpiece to form a chamber of generally epitrochoidal configuration, which comprises
  a. rotatably supporting cutting tools for movement about an axis and causing the tools to be urged away from said axis;
  b. so positioning the workpiece relative to the rotational axis of the cutting tools that said rotational axis intersects the major axis of the epitrochoidal contour at a point offset from the major axis thereof;
  c. with the workpiece so positioned, machining a first lobe of said epitrochoidal contour, by advancing said workpiece and/or tools axially;
  d. relatively repositioning the workpiece and cutting tools such that said rotational axis intersects said major axis on the opposite side of and offset from said minor axis; and
  e. with the workpiece and tools thus relatively repositioned, machining the second lobe of the epitrochoidal contour.

2. The method of claim 1, further characterized by
  a. the cutting tools are caused to be urged away from said axis at least in part by the centrifugal force of rotation.

3. The method of claim 1, further characterized by
  a. said minor axis has a length relationship to the major axis of around 0.6 – 0.8 to one, and
  b. said rotational axis is offset from said minor axis, in steps (a) and (c) of claim 1, a distance of approximately 7–10 percent of the overall length of the major axis.

4. The method of claim 1, further characterized by
  a. said rotational axis being offset, in steps (a) and (c) of claim 1, such a distance that the distance from the axis of rotation to the point of intersection of the minor axis with the epitrochoidal contour approximately equals the distance from said axis of rotation to the point of intersection of the major axis with said contour.

5. The method of claim 1, further characterized by
  a. said rotational axis being offset, in steps (a) and (c) of claim 1, such that the positive and negative rake angles of cutting tools, aligned generally along axes disposed radially with respect to said rotational axis, do not substantially exceed 15°.

6. The method of machining a workpiece to form a contour of significantly non-circular contour, which comprises
  a. non-rotatably positioning the workpiece,
  b. rotatably supporting a cutting tool for movement about a predetermined rotational axis offset from the geometrical center of said non-circular contour,
  c. positively and controllably positioning the cutting tool in variable relation to said rotational axis as a function of the rotational position of the tool, whereby the cutting edge of the rotating tool follows a predetermined non-circular path,
  d. a predetermined limited portion only of said tool path coinciding with a first limited portion only of the non-circular contour of the workpiece,
  e. machining said first limited portion of said non-circular contour in the region of coincidence of said tool path and said contour,
  f. relatively repositioning the workpiece and rotational axis, whereby said predetermined limited portion of the tool path is coincident with a further portion of said non-circular contour,
  g. machining said further portion of the contour, and
  h. repeating steps (f) and (g) if and to the extent necessary to machine substantially the entirety of said contour.

7. The method of claim 6, further characterized by
  a. said non-circular contour is substantially an epitrochoid, and
  b. in each of two stages of machining, substantially one half of said contour is coincident with said tool path.

* * * * *